United States Patent [19]

Takikawa et al.

[11] Patent Number: 4,656,468

[45] Date of Patent: Apr. 7, 1987

[54] PATTERN DATA PROCESSING APPARATUS

[75] Inventors: Kei Takikawa, Yokohama; Hirofumi Kanemaki, Isehara, both of Japan

[73] Assignees: Nippon Telegraph and Telephone Corporation; Sony Corporation, both of Japan

[21] Appl. No.: 575,986

[22] Filed: Feb. 1, 1984

[30] Foreign Application Priority Data

Feb. 4, 1983 [JP] Japan ................................. 58-17096
Apr. 23, 1983 [JP] Japan ................................. 58-72352

[51] Int. Cl.$^4$ ............................................. G09G 1/14
[52] U.S. Cl. .................................. 340/744; 340/747; 340/798
[58] Field of Search ............... 340/723, 732, 729, 747, 340/750, 744, 789, 798, 799; 364/522

[56] References Cited

U.S. PATENT DOCUMENTS 4,368,463 1/1983 Quilliam ............................. 340/744
4,425,559 1/1984 Sherman ............................. 340/750

FOREIGN PATENT DOCUMENTS

2113056 7/1983 United Kingdom ................ 340/729

Primary Examiner—Gerald L. Brigance
Assistant Examiner—Jeffery Brier
Attorney, Agent, or Firm—Lewis H. Eslinger; Alvin Sinderbrand

[57] ABSTRACT

A pattern data processing apparatus processes pattern data based on which a predetermined pattern is displayed in a display area. The pattern data has data corresponding to both said display area and a data calculating area outside of said display area, the display area being divided into a plurality of pixels. The pattern data processing apparatus comprises a flag data generator for generating first flag data indicating whether each of the pixels is located within a closed area of the pattern from the pattern data, a flag data memory having a memory area substantially corresponding to the display area for storing the flag data, read-out means for reading out the flag data from the flag data memory in a predetermined scanning direction, means for processing the pattern data inside of the closed area of the pattern by using the flag data read out of the flag data memory, and means for successively mapping the pattern data from the data calculating area into an outermost peripheral portion of the flag memory and for storing second flag data representing flags of the data in the data calculating area.

15 Claims, 15 Drawing Figures

PATTERN DATA PROCESSING APPARATUS

BACKGROUND OF THE INVENTION

1. Field of the Invention

The present invention relates to a pattern data processing apparatus for incorporation in integrated services of digital network (so-called "Information Network System) for displaying desired graphics patterns on a monitor image display based on data transmitted via a digital communication line.

2. Description of the Prior Art

Where a process is to be performed for displaying a graphics pattern based on pattern information such as vertex information on a polygon transmitted via a digital communication line and for shading an internal portion of the pattern, it is necessary to detect a closed area in the pattern. There are known two processes for detecting such a closed area.

The first process requires a memory for storing all information on the shape of a given graphics pattern. The second process needs no memory and searches for a closed area based on information as to the intersections of a given pattern. With the first process, since information on the closed area is stored in the memory, the process can employ various types of shading (shading over the full surface, vertical hatching, horizontal hatching, cross-hatching, slant hatching) and various processing directions (downward, rightward, etc.). However, the memory is required to have quite a large capacity as it has to store all pattern information given.

According to the second processes, received vertex information items are sequentially connected to find a straight line, then an intersection of the straight line and a scanning direction, and the closed area is shaded using the intersection information. Although the second process requires no memory, a program for performing the process is complex and the time required for effecting the process is long. Since complicated processing such as crosshatching is difficult to achieve, the types of processing that can be accomplished are limited.

SUMMARY OF THE INVENTION

Therefore, it is an object of the present invention to provide a pattern data processing apparatus capable of detecting a closed area with a memory of a small capacity.

Another object of the present invention is to provide a pattern data processing apparatus capable of coping with various processes of processing a closed area and of processing the closed area in a short period of time.

Still another object of the present invention is to provide a pattern data processing apparatus which can properly determine a shaded area.

According to the present invention, there is provided a pattern data processing apparatus for processing pattern data based on which a predetermined pattern is displayed in a display area, the pattern data having data corresponding to both the display area and a data calculating area outside of the display area, the display area being divided into a plurality of pixels. The pattern data processing apparatus comprises a flag data generator for generating first flag data indicating whether each of the pixels is located within a closed area of the pattern from the pattern data, a flag data memory having a memory area substantially corresponding to the display area for storing the flag data, read-out means for reading out the flag data from the flag data memory in a predetermined scanning direction, means for processing the pattern data inside of the closed area of the pattern by using the flag data read out of the flag data memory, and means for successively mapping the pattern data from the data calculating area into an outermost peripheral portion of the flag memory and for storing second flag data representing flags of the data in the data calculating area.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
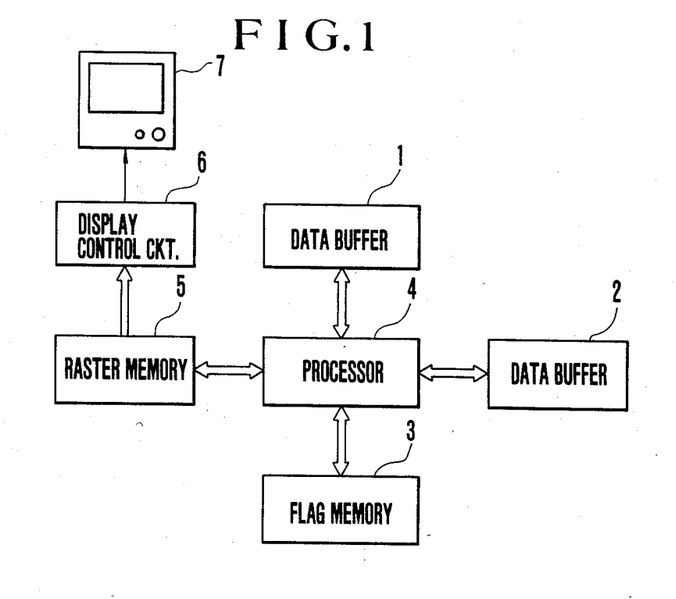
FIG. 1 is a block diagram of a pattern data processing apparatus according to an embodiment of the present invention.

FIG. 1 shows an overall arrangement of a pattern data processing apparatus according to the present invention. The pattern data processing apparatus includes data buffers 1, 2 for storing received data, a flag data memory 3, and a processor 4 comprising a microcomputer.

In the embodiment of the present invention, a language called PDI (Picture Description Instruction) is employed for expressing graphics patterns. The language expresses a graphics pattern through a combination of five basic pattern display elements: point, line, arc, rectangle, and polygon. Received data written in this language is composed of common control commands, a picture description command, and vertex data. The common control commands include a command for instructing the display of a character or a graphics pattern, a command for setting a parameter such as the size of a logic pixel, and others, and are stored in the data buffer 1. The picture description command serves to designate a display area, an image color, a contour line, and a processing type for a closed area. The vertex data includes vertex data as defined by a coordinate system for a data calculating area and a command for indicating whether the vertex data forms a straight line, an arc, or a polygon and whether a closed area is to be processed. The picture description command and the vertex data are stored in the data buffer 2.

The processor 4 operates to generate flags (described later) using the data stored in the data buffers 1, 2 and to write the flags into the flag memory 3. The processor 4 also reads the flags out of the flag memory 3 and writes desired picture data from the processor 4 into a raster memory 5 at predetermined addresses therein. The raster memory 5 has a memory area corresponding to a display area (one frame, for example). The picture data as read out of the raster memory 5 is supplied through a display control circuit 6 to a monitor display 7. The raster memory 5 is scanned in synchronism with beam scanning in the monitor display 7.

Figure 2:
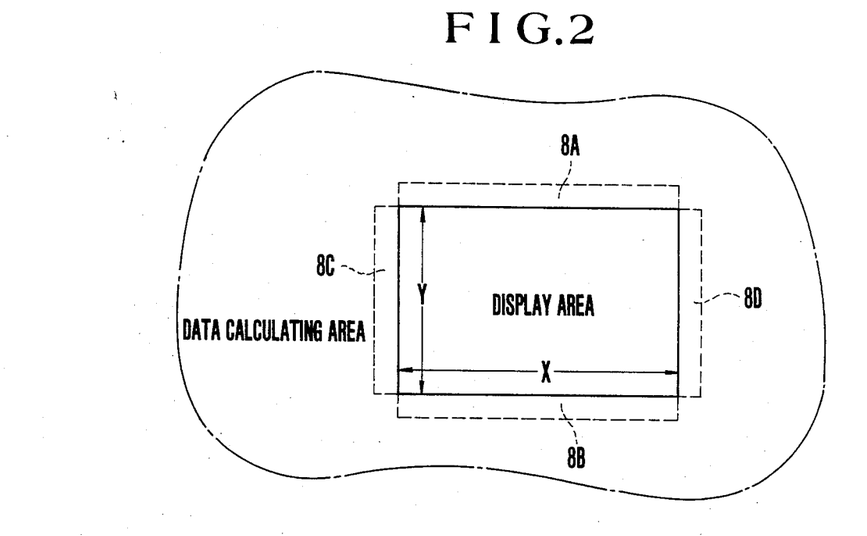
FIG. 2 is a diagram explanatory of a flag memory.

As shown in FIG. 2, the flag memory 3 has a memory area corresponding to the display area and composed of horizontal X pixels and vertical Y pixels and outer frames 8A, 8B, 8C and 8D added respectively to four sides of the area and each having a width equal to that of one pixel. The display area corresponds to an entire screen, or a portion thereof, of the monitor display 7. The data calculating area is composed of an area obtained by removing the display area from an area having a size determined by bit numbers in a two-dimensional plane. As an example, the data calculating area and the display area jointly form four frames. For reducing necessary calculations, a closed area is detected and processed with a logic pixel composed of a plurality of physical pixels being handled as a unit.

Figure 3:
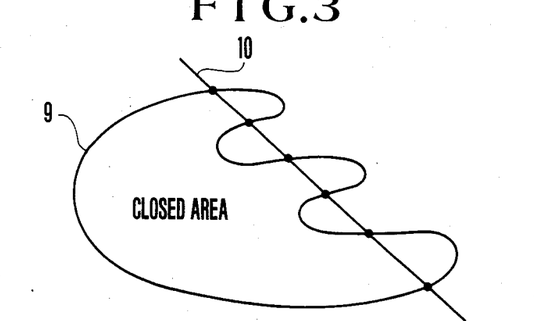
FIG. 3 is a diagram explanatory of a process for detecting a closed area according to the present invention.

Flags are generated respectively in the display area and the data calculating area. As illustrated in FIG. 3, a closed area 9 and a straight line 10 intersect each other at an even number of points. Assuming that the straight line 10 is indicative of a processing direction, therefore, a shading process is effected from the first intersection point to a next intersection point, and no shading is performed between the next intersection point and a succeeding next intersection point since no closed area 9 is interposed between the points. Thus, the areas sandwiched between two adjacent intersection points are alternately shaded.

The detection of a closed area will be described with reference to an example in which vertex data in received data indicates a polygon. A prescribed initial flag (expressed by "0") is set in each of the pixels of the flag memory 3. Then, one straight line constituting a contour of the polygon is calculated from the received data and whether a plurality of pixels corresponding to the calculated straight line are contained in a display area is determined. Thereafter, prescribed flags different from the initial flags are written in addresses corresponding to the pixels that are contained in the display area. The flags related to the pixels contained in the display area are composed of a plurality of bits having first, second, and third identifying information, as described later on.

Figure 4:
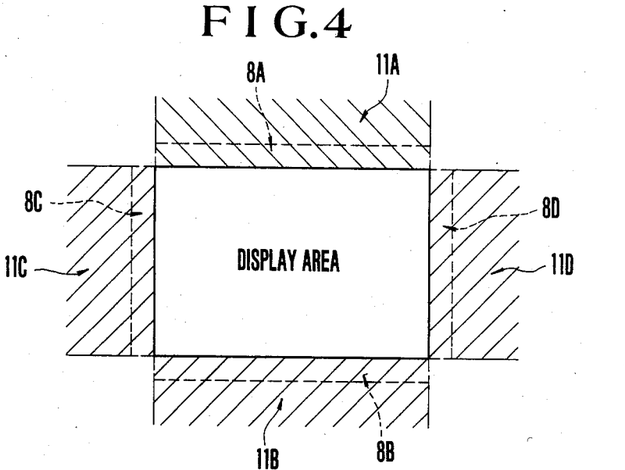
FIG. 4 is a diagram explanatory of a process for generating flags in a data calculating area according to the present invention.

The pixels outside of the display area, that is, contained in the data calculating area, are successively mapped into the outer frames 8A through 8D. As shown in FIG. 4, a straight line contained in an area 11A having a width X and extending upward vertically in the data calculating area is mapped into the outer frame 8A, a straight line contained in an area 11B having the width X and extending downward vertically is mapped into the outer frame 8B, a straight line contained in an area 11C having a width Y and extending horizontally in one direction is mapped into the outer frame 8C, and a straight line contained in an area 11D having the width Y and extending horizontally in the opposite direction is mapped into the outer frame 8D. The flags written in the outer frames 8A through 8D are each in the form of one bit which is either in an initial state (expressed in "0") or in a set state (expressed in "1"). When they are mapped, they are in a state different from that prior to the mapping. Accordingly, when an odd number of straight lines (hereinafter referred to as odd lines) are contained in each of the areas 11A through 11D, the flags become "1" as a result of successive mapping. Conversely, when an even number of straight lines (hereinafter referred to as even lines) are contained in each of the areas 11A through 11D, the flags become "0" as a result of successive mapping.

A process for mapping singular points contained in the areas 11A through 11D will be described with reference to FIG. 5. The mapping is to be performed in a horizontal direction in FIG. 5. A singular point Pa comprising a vertex where two oppositely slanting straight lines intersect will not be mapped. Singular points Pb, Pc comprising intersections of two oppositely slanting straight lines and a horizontal line will not be mapped with the points interconnected, because they will be regarded as the same as the singular point Pa. Singular points Pd, Pe comprising intersections of two similarly slanting straight lines and a horizontal line will be mapped with the points interconnected, because they will be regarded as the same as a singular point Pf. A singular point Pf comprising a vertex where two similarly slanting straight lines intersect will be mapped. The foregoing processing for singular points is basically the same in the display area and the data calculating area. Whether a point is a singular point or not can be determined by checking address information on successive pixels for a straight line sought to be processed.

Each of the straight lines of a polygon contained in the areas 11A through 11D of the data calculating area is mapped into the outer frames 8A through 8D. The outer frames 8A through 8D and the display area (flag memory 3) are scanned in a predetermined direction and sequence to read the flags. The areas between the flags in the set state are alternately shaded. The type and direction of shading, and whether the shading should contain the contour line, are determined by the received data.

A specific example wherein flags are generated when received data is representative of a polygon will be described with reference to FIGS. 6(A) and 6(B). When a polygon is given which extends over a display area and a data calculating area as illustrated in FIG. 6(A), flags are generated as shown in FIG. 6B for the pixels in the memory area and the outer frames 8A through 8D in the flag memory 3. The flags in the initial state are omitted from illustration in FIG. 6B. A flag indicated by "2" in the flag memory 3 is indicative of a singular point (same as the singular point Pa in FIG. 5).

Figure 5:
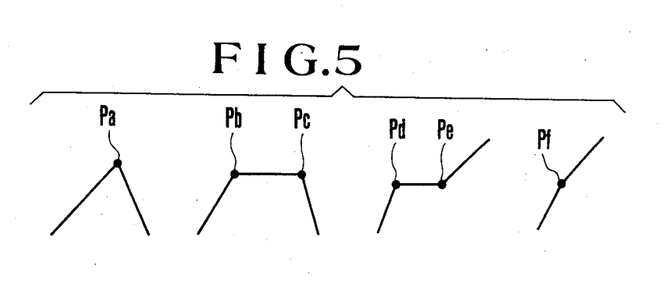
FIG. 5 is a diagram illustrative of the manner in which singular points are processed.
Figure 6A:
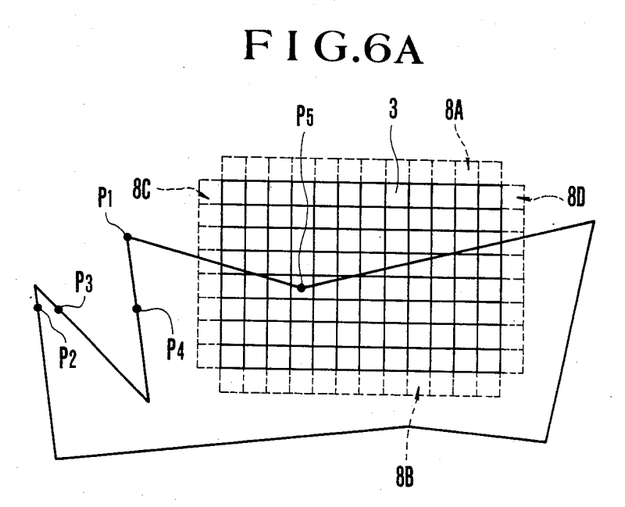
FIGS. 6(A) and 6(B) are diagrammatic illustrations of flags generated when received data represents a polygon.
Figure 6B:
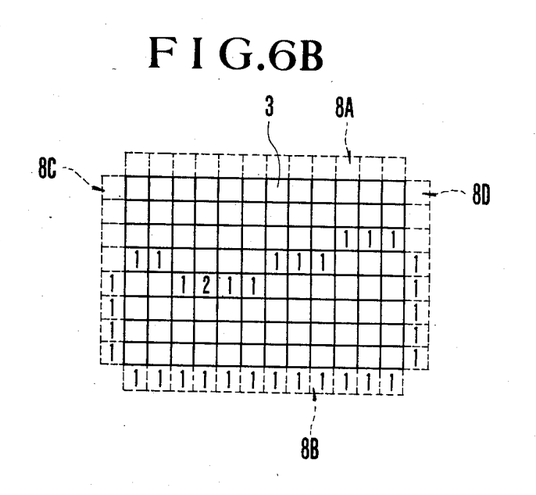

Since a point $P_1$ in FIG. 6A corresponds to the singular point Pa, as shown in FIG. 5 the flag at the corresponding address in the outer frame 8C is "0" as illustrated in FIG. 6B. Three points $P_2$, $P_3$, $P_4$ in the same horizontal position are successively mapped into the corresponding address in the outer frame 8C. As a result, the flag at this address is "1" as shown in FIG. 6B.

The flag corresponding to a singular point P₅ in the display area is "2". Since no polygonal straight line is present in the area 11A, the flags in the outer frame 8A are well "0". The flags in the outer frame 8B are all "1" as there is a straight line extending throughout the outer area 11B.

Pixels can be shaded vertically, horizontally, or obliquely by using the flags in the outer frame 8A through 8D and the flag memory 3. More specifically, the shading process is started from a flag "1" out of the flags in the outer frames 8A through 8D, and the pixels sandwiched between the flags "1" are alternately shaded such that a pixel or pixels positioned up to a next flag "1" in the scanning direction will be shaded, and a pixel or pixels succeeding the next flage "1" will not be shaded. Such shading processing is performed by the processor 4 which receives the flags read out of the flag memory 3 and writes processed picture data into addresses in the raster memory based on the received flags.

Shading processing for a circular or arcuate pattern will now be described. When a circle is to be processed, two vertex data and a picture description command indicative of a circle are received. The receiving side determines data on a circle with the two vertex data serving as a diameter through calculations. When an arc is to be processed, three vertex data and a picture description command indicative of an arc are received. The receiving side then determines data on an arc. The arcuate pattern can be formed by shading the data on the arc.

Figure 7:
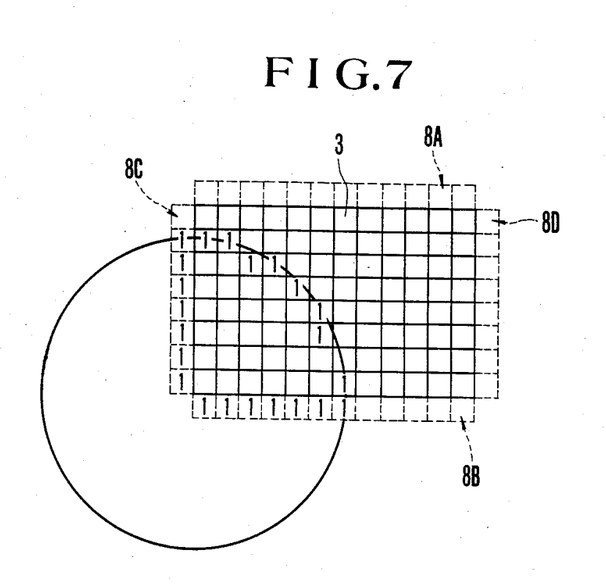
FIG. 7 is a diagrammatic illustration of flags generated when received data represents a circle.

A circle intersects a straight line at two points at most. Based on this property, where circle portions are displaced off the display area, flags may be set at all times in the corresponding frames. FIG. 7 illustrates, by way of example, the flags set when displaying a shaded quarter of a circle.

Figure 8:
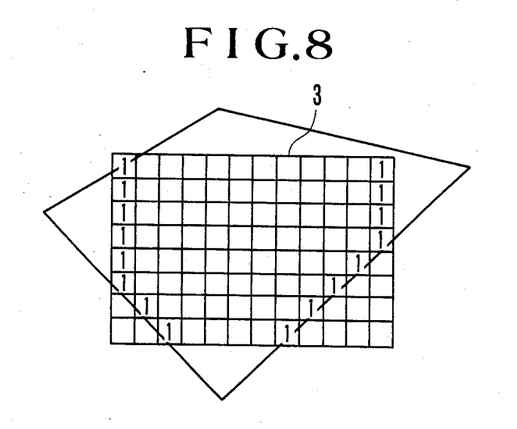
FIG. 8 is a diagrammatic illustration of flags generated when received data represents a polygon and the shading direction is predetermined to be in a horizontal direction.

In the foregoing embodiment, pattern information in four areas 11A through 11D is mapped into the outer frames 8A through 8D, respectively. In the case where the direction of shading (the direction of scanning the flag memory 3 and the outer frames 8A through 8D) is known in advance to be vertical or horizontal, only upper and lower or lateral outer frames may be added dependent on the direction of shading.

Where the shading direction is known, furthermore, all of the outer frames 8A through 8D may be dispensed with, and the memory area corresponding to the outermost peripheral rows of pixels in the flag memory 3 may be used for mapping. For example, where a polygon extending over the display area and the data calculating area is to be shaded as shown in FIG. 8 in a horizontal direction, the memory area corresponding to the two lateral outermost rows of pixels can be used for mapping. This arrangement allows a required flag memory to be smaller in capacity.

Shading of logic pixel units can be effected accurately by extracting closed area contours and identifying shaded areas in a coordinate system of logic pixel units. A flag related to each logic element is composed of a code signal having the following identification information $\alpha$, $\beta$, $\gamma$, rather than the simple "1" or "2".

Figure 9:
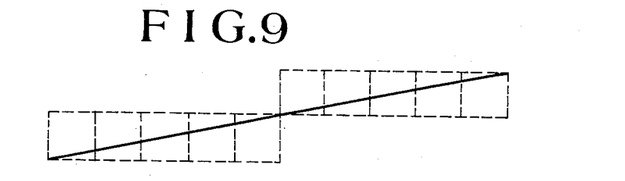
FIG. 9 is a diagrammatic illustration of flags in display areas according to another embodiment of the present invention.

The first identification information $\alpha$ serves to determine whether logic pixels belong to the same straight line. A plurality of straight lines forming a closed area are numbered for extracting the contours of the closed area. As illustrated in FIG. 9, a plurality of logic pixels (shown by the broken lines) related to one straight line have the same flag bit as the first identification information $\alpha$. By assigning n bits to the first identification information $\alpha$, $2^n$ straight lines can be identified.

Figure 10:
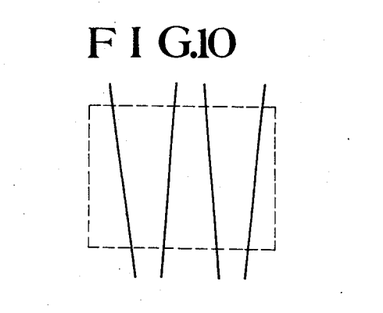
FIG. 10 is a diagrammatic illustration of one logic pixel containing a plurality of straight lines according to the embodiment of FIG. 9.

It is possible for a plurality of straight lines to be contained in one logic pixel as shown by the broken line in FIG. 10. Such a situation needs to be identified for determining the continuity of shading. When a plurality of straight lines are present in one logic pixel, the second identification information $\beta$ of a flag is indicative of whether such lines are even or odd in number.

Figure 11A:
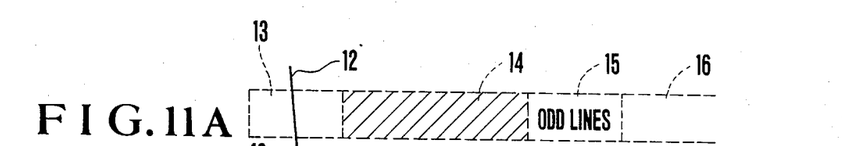
FIGS. 11(A)–11(D) are diagrammatic illustrations of shading in a display area according to the embodiment of FIGS. 9 and 10.
Figure 11B:
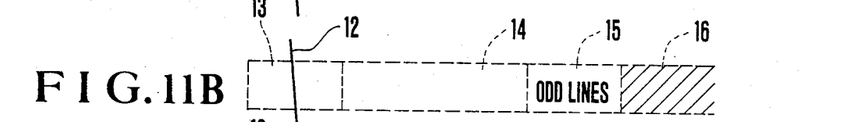
Figure 11C:
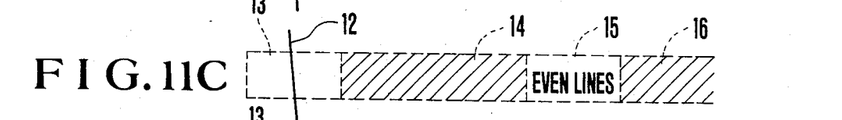
Figure 11D:
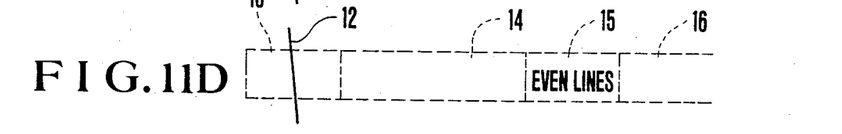

Identification of shaded areas will be described with reference to FIGS. 11(A)–11(D) which shows a logic pixel 13, a plurality of logic pixels 14 contiguous to the logic pixel 13, a logic pixel 15 contiguous to the logic pixels 14 and containing straight lines which are indicated by the second identification information $\beta$ as being even lines or odd lines, and a plurality of logic pixels 16 contiguous to the logic pixel 15. In FIGS. 11(A)–11(D), a straight line 12 extends through the logic pixel 13, and odd or even straight lines extend through the logic pixel 15.

Where odd straight lines are contained in the logic pixel 15 and the logic pixels 14 are determined to be shaded as shown in FIG. 11A, the logic pixels 16 will not be shaded. Where odd straight lines are contained in the logic pixel 15 and the logic pixels 14 are determined not to be shaded as shown in FIG. 11B, the logic pixels 16 will be shaded.

Where even straight lines are contained in the logic pixel 15 and the logic pixels 14 are determined to be shaded as shown in FIG. 11C, the logic pixels 16 will be shaded. Where even straight lines are contained in the logic pixel 15 and the logic pixels 14 are determined not to be shaded as shown in FIG. 11D, the logic pixels 16 will not be shaded.

Since the logic pixel 13 contains one, or odd, straight line 12, it will be understood from the foregoing description that the logic pixels disposed between the logic pixels positioned in the direction of shading and containing odd straight lines are alternately shaded.

The third identification information $\gamma$ is related to singular points, and will be processed in the same manner as the flags in the data calculating area as described above. For example, the singular points indicated respectively by Pa, Pb, Pc in FIG. 5 are skipped in the direction of shading, and the singular points Pd, Pe are processed as one point indicated by Pf.

As described above, a flag in the display area is composed of n bits indicative of the first identification information $\alpha$ corresponding to the number of straight lines forming a polygon, one bit indicative of the second identification information $\beta$ representing whether the number of straight lines in one logic pixel is even or odd, and one bit indicative of the third identification information $\gamma$ for identifying a singular point, the flag comprising a total of (n+2) bits. The shading processing can accurately be performed by allocating such a flag to each logic pixel in the display area.

With the arrangement of the invention, a closed area can be detected and flags can be generated for shading the closed area by employing a memory having a size corresponding to a display area or a combination of a display area and outer frames each having a width equal to that of a pixel. Since all flags for shading a closed area in a given graphics pattern are written in the memory, various types of shading can be carried out and the time required for pattern data processing can be shortened.

A flag corresponding to each logic pixel in the display area has an amount of information necessary for shading the closed area in the given pattern, so that the closed area can be shaded accurately and easily. With the flags for shading the closed area being written in the memory, it is possible to perform various shading types as compared with a process which determines whether an area is to be shaded successively on the basis of intersection information. According to the present invention, the contour of a graphics pattern can be drawn, and it is possible to effect hatching or crosshatching with horizontal and vertical lines and shading in a horizontal or vertical direction by using contour information.

Although certain preferred embodiments have been shown and described, it should be understood that many changes and modifications may be made therein without departing from the scope of the appended claims.

What is claimed is:

1. Apparatus for processing pattern data from which a processed pattern is displayed in a display area wherein there exists a predetermined scanning direction for said processing, and said pattern data having data corresponding to both said display area and a data calculating area outside of said display area, with said display area and said data calculating area being divided into a plurality of respective pixels, said pattern data processing apparatus comprising:
    a flag data generator receiving said pattern data for generating first flag data indicating whether each of said pixels is located at a boundary of a closed area of said pattern from said pattern data corresponding to said display area;
    a flag data memory having a memory area corresponding to said display area for storing said first flag data and having an outermost peripheral memory portion surrounding said memory area;
    means for successively mapping said pattern data corresponding to said data calculating area into addresses of said outermost peripheral memory portion to said flag data memory by generating second flag data and storing said second flag data in said outermost peripheral memory portion of said flag data memory;
    read-out means for reading out said first and second flag data from said flag data memory in said predetermined scanning direction; and
    means for processing said pattern data inside of said closed area of said pattern by using said first and second flag data read out of said flag data memory.

2. Apparatus according to claim 1, wherein said flag data memory has a main memory area corresponding to said display area and said outermost peripheral memory portion comprises an additional frame memory area positioned on four sides of said main memory area, and mapping means being arranged for mapping said flag data corresponding to said data calculating area into addresses of said additional frame memory area on the side corresponding to the pattern data to be mapped.

3. Apparatus according to claim 1, wherein each of said second flag data comprises a one-bit code which will alternate its state between one and zero at every successive mapping.

4. Apparatus according to claim 1, wherein said means for processing includes a raster memory having a memory area corresponding to said display area, said pattern data being stored in said raster memory after being varied by said flag data read out of said flag data memory.

5. Apparatus according to claim 1, wherein said first flag data comprises a plurality of flags wherein each said flag corresponds to each said pixel located at a boundary of said closed area, and wherein each said flag comprises first information indicating a line number of said predetermined pattern, second information indicating the number of lines contained in said corresponding pixel, and third information indicating that said corresponding pixel contains a singular point.

6. Apparatus according to claim 1, further comprising:
    a first buffer for storing a first part of said pattern data including common control commands; and
    a second buffer for storing a second part of said pattern data including picture description commands and vertex data, wherein said flag generator receives said pattern data stored in said first and second buffers.

7. Apparatus for processing pattern data from which a processed pattern is displayed in a display area, and wherein there exists a predetermined scanning direction for said processing, said pattern data having data corresponding to both said display area and a data calculating area outside of said display area, said display area and said data calculating area being divided into a plurality of respective pixels, said pattern data processing apparatus comprising:
    a flag data generator receiving said pattern data for generating from said pattern data corresponding to said display area first flag data indicating whether each of said pixels is located at a boundary of a closed area of said pattern;
    a flag data memory having a main memory area corresponding to said display area for storing said first flag data and a frame memory area positioned on four sides of said main memory area;
    means for successively mapping said pattern data corresponding to said data calculating area into addresses of said frame memory area of said flag data memory by generating second flag data and for storing second flag data in said frame memory area of said flag data memory, wherein each side of said pattern data in said data calculating area is mapped into the corresponding side of said frame memory area;
    read-out means for reading out said first and second flag data from said flag data memory in said predetermined scanning direction; and
    means for processing said pattern data inside of said closed area of said pattern by using said first and second flag data read out of said flag data memory.

8. Apparatus according to claim 7, wherein each of said second flag data comprises a one-bit code having alternate state of one and zero at every successive mapping.

9. Apparatus according to claim 7, wherein said means for processing includes a raster memory having a memory area corresponding to said display area, said pattern data being stored in said raster memory after being processed in response to said flag data read out of said flag data memory.

10. Apparatus according to claim 7, wherein said first flag data comprises a plurality of flags, each said flag corresponding to each said pixel located at said boundary of said closed area, and wherein each said flag comprises first information indicating a line number of said predetermined pattern, second information indicating the number of lines contained in said corresponding information pixel, and third information indicating that said corresponding pixel contains a singular point.

11. Apparatus according to claim 7, further comprising:
   a first buffer for storing a first part of said pattern data including common control commands; and
   a second buffer for storing a second part of said pattern data including picture description commands and vertex data, wherein said flag generator receives said pattern data stored in said first and second buffers.

12. A method of processing pattern data to display a processed pattern in a display area, in which there exists a predetermined scanning direction for the processing, said pattern data having data corresponding to both said display area and a data calculating area outside of said display area, and said display area and said data calculating area being divided into a plurality of respective pixels, the method comprising the steps of:
   receiving said pattern data;
   generating first flag data from said pattern data corresponding to said display area indicating whether each of said display area pixels is located at a boundary of a closed area of said pattern;
   storing said first flag data in a flag data memory having a memory area corresponding to said display area and having an outermost peripheral memory portion arranged on sides of said memory area;
   successively mapping and storing said pattern data corresponding to said data calculating area into addresses of said outermost peripheral memory portion of said flag memory as second flag data;
   reading out first and second flag data from said flag data memory in said predetermined scanning direction; and
   processing said pattern data inside of said closed area of said pattern by using said first and second flag data read out of said flag data memory.

13. A method of processing pattern data according to claim 12, wherein the step of receiving said pattern data includes storing a first part of said pattern data including common control commands in a first buffer; and storing a second part of said pattern data including picture description commands and vertex data in a second buffer.

14. A method of processing pattern data to display a processed pattern in a display area, wherein there exists a predetermined scanning direction for said processing, said pattern data having data corresponding to both said display area and a data calculating area outside of said display area, and said display area and said data calculating area being divided into a plurality of respective pixels, comprising the steps of:
   receiving said pattern data;
   generating first flag data from said pattern data corresponding to said display area indicating whether each of said display area pixels is located at a boundary of a closed area of said pattern;
   storing said first flag data in a flag data memory having a main memory area corresponding to said display area and additional memory areas positioned on four sides of said main memory area;
   successively mapping and storing said pattern data corresponding to said data calculating area into addresses of said additional memory areas of said flag memory as second flag data, wherein each side of said pattern data in said data calculating area is mapped into the corresponding side of said frame memory areas;
   reading out said first and second flag data from said flag data memory in said predetermined scanning direction; and
   processing said pattern data inside of said closed area of said pattern by using said first and second flag data read out of said flag data memory.

15. A method of processing pattern data according to claim 14, wherein the step of receiving said pattern data includes storing a first part of said pattern data including common control commands in a first buffer; and storing a second part of said pattern data including picture description commands and vertex data in a second buffer.

* * * * *